United States Patent [19]
Kihlstedt et al.

[11] 3,953,563
[45] Apr. 27, 1976

[54] METHOD FOR PRODUCING HIGH ALUMINA REFRACTORY MATERIAL

[75] Inventors: Per Gudmar Kihlstedt, Bromma; Knut Sven Eric Forssberg, Stockholm, both of Sweden

[73] Assignee: Advanced Mineral Research, Djursholm, Sweden

[22] Filed: Apr. 24, 1973

[21] Appl. No.: 353,972

Related U.S. Application Data

[63] Continuation-in-part of Ser. No. 130,037, March 31, 1971, abandoned.

[30] Foreign Application Priority Data
Apr. 1, 1970 Sweden................................ 4505/70

[52] U.S. Cl................................. 264/66; 106/62; 106/65; 106/73.4; 264/42; 264/82; 264/333
[51] Int. Cl.²................................ C04B 35/64
[58] Field of Search............... 264/56, 63, 82, 333, 264/42, 66; 106/62, 65, 59, 68, 73.4

[56] References Cited
UNITED STATES PATENTS

| | | | |
|---|---|---|---|
| 2,881,051 | 4/1959 | Pingard............................ | 23/313 X |
| 3,565,646 | 2/1971 | Housh............................. | 264/63 X |
| 3,608,060 | 9/1968 | Osment........................... | 106/104 X |
| 3,725,032 | 4/1973 | Kihlstedt......................... | 264/82 |

*Primary Examiner*—Robert F. White
*Assistant Examiner*—Thomas P. Pavelko
*Attorney, Agent, or Firm*—Fleit & Jacobson

[57] ABSTRACT

A method in the manufacture of high alumina refractory bricks containing more than 50% by weight alumina, in which moist refractory starting material is pressed into brick shapes, dried and hydrothermally bound. The principal binding agent used is finely divided activated alumina and is either added alone or together with any one of the substances slaked lime, slaked magnesia and finely divided silicon dioxide. The conditions chosen for the hydrothermal treatment being such as to convert essentially all the activated alumina into boehmite.

7 Claims, No Drawings

METHOD FOR PRODUCING HIGH ALUMINA REFRACTORY MATERIAL

This application is a continuation-in-part of Ser. No. 130,037, filed Mar. 31, 1971, and now abandoned.

The present invention relates to a method in the manufacture of high alumina refractory bricks containing more than 50% by weight of non-activated alumina.

The special properties of high alumina refractory bricks render them suitable for use in many different connections within the chemical and metallurgical industry. One important property with respect to several of the steel manufacturing and refining methods devised in recent time is that the bricks are comparatively resistant to attack by iron oxide. The binding agent used when applying known burning methods for sintering the brick material, however, are liable to impair the refractory properties of the bricks. Moreover, the general use of such bricks has been prohibited by the high cost of said bricks; one reason for the high price of high alumina refractory bricks being the expensive burning methods used when producing the same.

The main object of the present invention is to provide a method in the production of high alumina refractory bricks and similar refractories which permits a binding agent to be used which renders the bricks more suitable for use in chemical reactors and metallurgical furnaces than bricks sintered in accordance with conventional methods.

Another object of the invention is to provide a method which enables refractory bricks to be produced in a simple and inexpensive manner.

These objects are achieved by means of the present invention, which is mainly characterized by the steps of forming a damp mixture of an alumina rich material containing at least 50% by weight of non-activated alumina and a binding agent amounting to 5–50% by weight of the total mixture in dry state and comprising finely divided particles of activated alumina, pressing said moist mixture into brick shapes, drying said shapes to prevent crack formation during steam hardening, and steam hardening the shapes at a temperature of about 160°–230°C and a pressure of 5–70 atm for a period of 1–24 hours to thereby convert essentially all of the activated alumina into boehmite.

It has been observed, that the mechanical strength of high alumina refractory bricks produced in accordance with the invention is at room temperature lower with low contents of activated alumina binder than with higher contents thereof. On the other hand, at high temperatures the dimension stability of such refractories is lower with high activated alumina binder contents than with a low activated alumina binder content. Thus, in accordance with the invention, the activated alumina binder content used when manufacturing such refractories is suitably between 12–20 percent by weight, preferably about 15 percent by weight.

According to one feature of the invention the non-activated alumina containing material and the binding agent are suitably both practically completely comprised of $Al_2O_3$. The boehmite ($\gamma$-AlO(OH)), which is formed during the autoclaving process, decomposes at high temperatures to $\alpha$-$Al_2O_3$, whereby when used in metallurgical furnaces for example, the refractory brick obtains a uniform and highly refractory composition. The mechanical strength of the hydrothermally bound refractory brick consisting practically exclusively of $Al_2O_3$ is good, as is also its dimension stability. For example, the compression strength of such refractory brick has been established experimentally to be in excess of 400 kp/cm², e.g. in the region of 600–700 kp/cm².

By exhaustively testing different $Al_2O_3$ substances for use as a suitable binding agent in the manufacture of refractory bricks according to the invention, it has been found that the strongest binding effects are obtained when using activated alumina. Activated alumina, i.e. transition aluminas, contains different alumina phases, such as $\gamma$-$Al_2O_3$, $\Theta$-$Al_2O_3$, and often some corundum, $\alpha$-$Al_2O_3$. The activated alumina may suitably be produced from aluminiumhydroxide, such as bayerite, or other decomposable aluminium compounds such as $Al_2(SO_4)_3$ by calcination at temperatures within the range of 200°–1300°C, suitably 500°–1000°C. The activated aluminas have a specific surface normally of the order of magnitude of 35–500 m²/g as calculated by the BET method. The specific surface selected is not especially critical to the successful application of the invention, but successful results can be obtained at any point within the above limits.

In accordance with another feature of the invention, by using slaked lime, i.e. $Ca(OH)_2$, in a quantity of 1–5% by weight, or slaked magnesia, i.e. $Mg(OH)_2$, in a quantity of 1–25% by weight as a binding agent together with the activated alumina, it is possible to increase the dimension stability and, at both high and low temperatures, the mechanical strength of the autoclaved refractory bricks, although the pyrometric cone equivalent (PCE) of these bricks is naturally lower than the PCE of the pure $Al_2O_3$ brick. For example, a compression strength which exceeds 800 kp/cm² can be obtained when using slaked lime or slaked magnesia as a binding agent.

When slaked lime is used together with activated alumina as the binding agent, the activated alumina is suitably present in a quantity of 10–15% by weight and the slaked lime is suitably present in a quantity of 2–5% by weight, the remainder comprising non-activated alumina. The preferred proportions of activated alumina and slaked lime, however, are about 12% by weight activated alumina and about 3% by weight slaked lime. When slaked magnesia is used together with activated alumina as the binding agent, the activated alumina is suitably present in a quantity of 10–15% by weight, preferably about 10% by weight, and the slaked magnesia is suitably present in a quantity of 2–8% by weight, preferably about 5% by weight.

In accordance with a further feature of the invention, by using finely divided or reactive $SiO_2$ in a quantity of 1–10% by weight and having a specific surface exceeding 20,000 cm²/cm³ as a binding agent together with the activated alumina, a desirable mullite formation ($3Al_2O_3 \cdot 2SiO_2$) can be obtained in the binder phase when using the refractory bricks at high temperatures, e.g. temperatures in excess of 1400°C. The $SiO_2$-binder may suitably substantially comprise to advantage silicon fume obtained with metallurgical silicon iron manufacturing process and having minute particle size.

When $SiO_2$ is used as a binder together with activated alumina, the alumina is suitably present in a quantity ranging from 10–15% by weight, preferably about 13% by weight, and the silicon dioxide is suitably present in a quantity of 1–5% by weight, preferably about 2% by weight.

Certain other substances can be added to the binding agent in order to improve the properties of the refractory bricks with respect to resistance to changes in temperature, resistance to attack by metallurgical slags etc. Examples of such substances are $Cr_2O_3$, $TiO_2$, $ZrO_2$, $BaO$, $BeO$, $P_2O_5$, $SrO$, $Y_2O_3$ and $ZnO$.

The particle size distribution of and the proportions between the non-active alumina-rich material and the binding agent is suitably selected so that the finished bricks have a porosity which is essentially the same as that of conventional fired high alumina refractory bricks, e.g. not exceeding 20%, suitably of the order of magnitude of 15%. This means in practice that the finely divided activated alumina binder used normally has to have a particle size of less than 50 $\mu$m. Commercially available active aluminas mostly have a specific surface of roughly 50–200 $m^2/g$ (calculated by the BET method) and it is preferred to use active aluminas having this normal specific surface when practising the present invention.

By using crushed brick-scrap, for example obtained from demolished furnace or reactor linings and containing 50–100% by weight alumina, as a non-activated alumina ballast material, preferably as the main ingredient of the refractory brick according to the invention, it is possible to decrease substantially the cost of the brick. Large portions of demolished furnace and reactor linings still contain fresh non-active alumina-containing material, which can be used effectively as ballast material when producing high alumina refractories in accordance with the invention.

It has been found that penetration of slag and other chemicals into high alumina refractory brick is accompanied by a softening of the brick material, whereby unfavourably affected goods, not suitable for use with the present invention, are mainly obtained in the finest fractions, after crushing the material. Consequently, by removing the fine fractions, e.g. as by screening, the ballast material can be considerably improved.

With regard to steel metallurgical processes, it has been found that the unfavourably affected scrap-brick material is more magnetic than fresh brick material. Consequently, any affected material remaining after crushing and optional screening of the material can be removed by dry-magnetic enrichment processes.

When dressing scrap alumina brick material in accordance with the aforementioned processes, a yield of approximately 70% of acceptable non-active ballast material has been achieved. By adding a binding agent to this ballast material and subsequent to optionally adding fresh non-active alumina-rich material, a refractory brick has been produced having the same properties as those obtained when using solely fresh non-active alumina.

In accordance with the invention, the refractory brick can be treated in the autoclave in essentially the same manner as when autoclaving sand-lime brick. The pressed bricks are stacked on carriages which are then moved into cylindrical autoclaves. Different autoclaving techniques can be used, although the main portion of the original air content of the autoclave is normally removed by blowing with steam or by vacuum pumping. Suitably the pressed bricks are treated in the autoclave with saturated steam at a temperature of more than 185°C, preferably about 195°–220°C, and corresponding pressure. The time used to autoclave the bricks is preferably from 12–20 hours.

It has, however, been found that the normal autoclaving technique can give rise to crack formation in the bricks if water is added thereto during the pressing operation. The addition of water, however, improves the pressibility of the bricks and increases their final mechanical strength. To avoid the formation of cracks, when water has been added during the pressing operation, it has been found expedient to dry the bricks prior to treating the bricks in the autoclave, suitably to a water content below 4% by weight and preferably below 2% by weight. This is particularly applicable to bricks of low porosity, since water trapped in the pores is liable to rupture the brick during the autoclaving process.

The autoclaved high alumina refractory bricks have an unusually low modulus of elasticity and therefore absorb furnace stresses and strains in a more advantageous manner than burned alumina refractory bricks.

In order to obtain a brick of high mechanical strength, e.g. a compression strength in the region of 900–1100 $kp/cm^2$, at lower temperatures, the refractory brick produced by pressing and autoclaving can be heat treated at a temperature of 200°–600°C. However, this increase in mechanical strength is lost if the bricks are again heated to or used at higher temperatures, e.g. 600°–700°C. By burning the bricks produced by pressing and autoclaving at temperatures of 1000°–1800°C, however, it is possible to produce a refractory brick of very high mechanical strength, which is retained at very high temperatures.

The invention will now be illustrated further with reference to a number of examples.

EXAMPLE 1

65% by weight of comminuted non-activated alumina having an approximate particle size of $K_{80}=0.8$ mm (i.e. 80% by weight of the alumina particles pass through a mesh having an opening size of 0.8 mm was admixed with 20% by weight of a non-activated alumina having an approximate particle size of $K_{80}=0.05$ mm and 15% by weight activated alumina having a specific surface of about 54 $m^2/g$ and an approximate particle size of $K_{80}=0.01$ mm. The materials were carefully mixed and a quantity of water amounting to 5% by weight of the mix was added thereto. Mixing was continued until it could be seen visually that the mix was homogeneous. The mix was then charged to a hydraulic press and slugs having a diameter of 40 mm and a height or length of 30 mm were produced therein at a pressure of about 1500 $kp/cm^2$. The slugs were then removed from the press and dried to steady weight for approximately 16 hours at 105°C, so that the water content of the slugs was less than 1% by weight. The dried slugs were then autoclaved for 16 hours at 205°C and corresponding pressure in a saturated steam atmosphere.

It was found that the autoclaved slugs had a porosity of about 18% and a cold compression strength of about 2100 $kp/cm^2$, when a load was applied to the opposing end surfaces of the slugs.

EXAMPLE 2

In the manner of Example 1, 65% by weight of non-activated alumina having an approximate particle size of $K_{80}=0.8$ mm, 17% by weight of non-activated alumina having an approximate particle size of $K_{80}=0.05$ mm and 15% by weight activated alumina having a specific surface of about 54 $m^2/g$ and an approximate particle size of $K_{80}=0.01$ mm where admixed with 3% by weight slaked lime ($Ca(OH)_2$) having an approximate particle size of $K_{80}=0.03$ mm and a specific surface of about 10 $m^2/g$. Water was added to a content of 5% by weight of the mix. The mix was then treated in the manner disclosed in example 1, to form autoclaved slugs.

The slugs were found to have a porosity of about 17% and a cold compression strength of about 2300 $kp/cm^2$, when measured in accordance with Example 1.

EXAMPLE 3

65% by weight of non-activated alumina having an approximate particle size of $K_{80}=0.8$ mm, 17% by weight of non-activated alumina having an approximate particle size of $K_{80}=0.05$ mm and 13% by weight of activated alumina having a specific surface of about 54 $m^2/g$ and an approximate particle size of $K_{80}=0.01$ mm were admixed with 5% by weight of slaked magnesia ($Mg(OH)_2$) having an approximate particle size of $K_{80}=0.04$ and a specific surface of about 4 $m^2/g$ to form a visually homogeneous mix. Water was added to a content of 5% by weight of the mix. The mix was then treated in the manner disclosed in Example 1 to form autoclaved slugs.

The slugs were found to have a porosity of about 20% and a cold compression strength of about 2200 $kp/cm^2$, when measured in accordance with Example 1.

EXAMPLE 4

65% by weight of non-activated alumina having an approximate particle size of $K_{80}=0.8$ mm, 18% by weight of non-activated alumina having an approximate particle size of $K_{80}=0.05$ and 15% by weight of activated alumina having a specific surface of about 54 $m^2/g$ and an approximate particle size of $K_{80}=0.01$ mm were admixed with 2% silica ($SiO_2$) having an approximate particle size of $K_{80}=0.002$ and a specific surface of about 10 $m^2/g$ to form a visually homogeneous mix. Water was added to a content of 5% by weight of the mix. The mix was then treated in the manner disclosed in Example 1 to form autoclaved slugs.

The slugs were found to have a porosity of about 15% by volume and a cold compression strength of about 3100 $kp/cm^2$, when measured according to Example 1.

We claim:

1. A method in the manufacture of high refractory bricks containing more than 50% by weight of non-activated alumina, the method comprising forming a damp mixture of an alumina rich material containing at least 50% by weight non-activated alumina and a binding agent amounting to 5–50% by weight of the total mixture in dry state and comprising finely divided particles of activated alumina, pressing said moist mixture into brick shapes, drying said shapes to prevent crack formation during steam hardening, and steam hardening the shapes at a temperature of about 160°–230°C and a pressure of 5–70 atm for a period of from 1–24 hours until essentially all of the activated alumina has been converted into boehmite.

2. A method according to claim 1, characterized in that slaked lime in quantities of 1–5% by weight of the total mixture in dry state is used as a binding agent together with the activated alumina.

3. A method according to claim 1, characterized in that $Mg(OH)_2$ in quantities of 1–25% by weight of the total mixture in dry state is used as a binding agent together with the activated alumina.

4. A method according to claim 1, characterized in that finely divided $SiO_2$ in quantities of 1–10% by weight of the total mixture in dry state and having a specific surface exeeding 20.000 $cm^2/cm^3$ is used as a binding agent together with the activated alumina.

5. A method according to claim 1, characterized in that said non-activated alumina comprises crushed brick-scrap material having an $Al_2O_3$ content of 50–100% by weight.

6. A method according to claim 5, characterized in that the crushed brick-scrap material used is purified by means of at least one of the steps of the removing magnetic portions and removing easily crushed portions therefrom.

7. A method according to claim 1, characterized in that the refractory bricks produced by pressing and autoclaving are burned at a temperature of 1000°–1800°C.

* * * * *